United States Patent
Hecht (10) Patent No.: US 9,033,621 B2
(45) Date of Patent: May 19, 2015

(54) CUTTING INSERT, CUTTING BODY AND CLAMPING MECHANISM OF A CUTTING TOOL ASSEMBLY FOR CHIP REMOVAL

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 525 days.

(21) Appl. No.: 13/597,524

(22) Filed: Aug. 29, 2012

(65) Prior Publication Data

US 2013/0071194 A1 Mar. 21, 2013

Related U.S. Application Data (60) Provisional application No. 61/536,285, filed on Sep. 19, 2011.

(51) Int. Cl.
| B23B 27/00 | (2006.01) |
| B23C 5/08 | (2006.01) |
| B23C 5/22 | (2006.01) |
| B23C 5/16 | (2006.01) |

(52) U.S. Cl.
CPC .......... B23C 5/08 (2013.01); *Y10T 407/23* (2015.01); *Y10T 407/2274* (2015.01); *B23C 2200/361* (2013.01); *B23C 2210/168* (2013.01); B23C 5/2213 (2013.01); *B23C 2200/0494* (2013.01); *B23C 2200/165* (2013.01)

(58) Field of Classification Search
CPC B23B 27/045; B23B 27/083; B23B 27/1614; B23B 29/043; B23B 2200/161; B23B 2200/165; B23B 2200/369
See application file for complete search history.

(56) References Cited

U.S. PATENT DOCUMENTS

| 3,289,272 | A | | 12/1966 | Stier |
| 3,913,197 | A | * | 10/1975 | Wolf ............................ 407/47 |
| 4,615,650 | A | | 10/1986 | Hunt |
| 5,156,502 | A | | 10/1992 | Satran |
| 5,199,828 | A | | 4/1993 | Forsberg et al. |
| 5,957,628 | A | * | 9/1999 | Bentjens et al. ............ 407/35 |
| 6,203,251 | B1 | * | 3/2001 | Oppelt et al. ............... 407/48 |

(Continued)

FOREIGN PATENT DOCUMENTS

| DE | 200946 A1 | 9/1970 |
| DE | 2231550 A1 | 1/1974 |

(Continued)

OTHER PUBLICATIONS

International Search Report dated Feb. 1, 2013 issued in PCT counterpart application (No. PCT/IL2012/050400).

*Primary Examiner* — Will Fridie, Jr.
(74) *Attorney, Agent, or Firm* — Womble Carlyle (57) ABSTRACT

A cutting insert (14) is formed with an insert aperture (32) opening out to insert top and bottom surfaces (14A, 14B) of the cutting insert (14). In a plan view of the insert top surface (14A), the cutting insert (14) and the insert aperture (32) both have oblong shapes which are elongated along a common insert longitudinal axis ($A_{IL}$). The aperture (32) includes first and second side surfaces (32A1, 32A2) which each extend along the insert longitudinal axis ($A_{IL}$), and aperture first and second end surfaces (32B1, 32B2) which each extend transverse relative to the insert longitudinal axis ($A_{IL}$). At least one of the aperture first and second end surfaces (32B1, 32B2) is formed with a clamping lip (32C1, 32C2).

25 Claims, 6 Drawing Sheets

(56) References Cited

U.S. PATENT DOCUMENTS

| | | |
|---|---|---|
| 6,986,866 B2 | 1/2006 | Gubanich et al. |
| 7,090,443 B2 | 8/2006 | Hecht et al. |
| 7,431,539 B2 | 10/2008 | Erickson et al. |
| 7,670,088 B2 * | 3/2010 | Andersson et al. ............. 407/33 |
| 7,887,266 B2 * | 2/2011 | Hecht ............................. 407/46 |
| 2006/0120812 A1 | 6/2006 | Hecht et al. |
| 2008/0240873 A1 | 10/2008 | Furuki |
| 2009/0035074 A1 | 2/2009 | Craig et al. |
| 2009/0035076 A1 | 2/2009 | Hecht |
| 2011/0305532 A1 | 12/2011 | Harif |

FOREIGN PATENT DOCUMENTS

| | | |
|---|---|---|
| JP | 10 296516 A | 11/1998 |
| SU | 704727 A1 | 12/1979 |
| WO | 2009/019676 | 2/2009 |

* cited by examiner

CUTTING INSERT, CUTTING BODY AND CLAMPING MECHANISM OF A CUTTING TOOL ASSEMBLY FOR CHIP REMOVAL

RELATED APPLICATIONS

The present application claims priority to U.S. Provisional Patent Application No. 61/536,285, filed 19 Sep. 2011. The contents of the aforementioned application are incorporated by reference in their entirety.

FIELD OF THE INVENTION

The subject matter of the present application relates generally to metal-working machine cutting tools for chip removal, and in particular cutting tool bodies and cutting inserts therefor, as well as clamping mechanisms for clamping the cutting inserts to the cutting bodies. More precisely, certain aspects can have specific advantages for tools configured to cut (in operations such as slotting and grooving) shapes having a width which is substantially narrow relative to a depth thereof.

BACKGROUND OF THE INVENTION

Cutting tool assemblies often utilize cutting inserts. The cutting inserts can be clamped to a cutting tool's body by bringing a clamping mechanism of the cutting tool to a clamped position. When the cutting insert needs to be replaced, the clamping mechanism can be brought to an unclamped position and the cutting insert can then be removed from the cutting body and replaced.

U.S. Pat. No. 7,431,539, U.S. Pat. No. 7,090,443, U.S. Pat. No. 6,986,866, U.S. Pat. No. 5,199,828, U.S. Pat. No. 5,156,502, U.S. Pat. No. 4,615,650 and WO 2009/019676 disclose cutting inserts and/or cutting tool assemblies having a clamping mechanisms for securing cutting inserts thereto.

SUMMARY OF THE INVENTION

In accordance with a first aspect of the subject matter of the present application, there is provided a cutting insert formed with an insert aperture opening out to insert top and bottom surfaces of the cutting insert. In a plan view of the insert top surface, the cutting insert and the insert aperture both have oblong shapes which are elongated along a common insert longitudinal axis. The aperture includes first and second side surfaces which each extend along the insert longitudinal axis, and aperture first and second end surfaces which each extend transversely relative to the insert longitudinal axis. At least one of the aperture first and second end surfaces is formed with a clamping lip.

In accordance with another aspect of the subject matter of the present application, there is provided a cutting insert having an insert longitudinal axis and comprising opposing insert top and bottom surfaces, opposing insert first and second end surfaces extending transverse to the insert longitudinal axis and, each end surface connected to the insert top and bottom surfaces, opposing insert first and second side surfaces extending along the insert longitudinal axis, each side surface connected to the insert top and bottom surfaces and to the insert first and second end surfaces, an insert first intersection defined at an intersection of the insert top surface, the insert first end surface and the insert first side surface, an insert second intersection defined at an intersection of the insert top surface, the insert first end surface and the insert second side surface, a cutting edge extending from the insert first intersection to the insert second intersection, and an insert aperture opening out to the insert top and bottom surfaces; the insert aperture comprising opposing aperture first and second side surfaces extending along the insert longitudinal axis, and opposing aperture first and second end surfaces extending transverse to the insert longitudinal axis, and each being connected to the aperture first and second side surfaces; wherein, in a plan view of the insert top surface, the cutting insert and the insert aperture both have oblong shapes which are elongated along the insert longitudinal axis; and wherein at least one of the aperture first and second end surfaces is formed with a clamping lip.

In accordance with still another aspect of the subject matter of the present application, there is provided a cutting tool body comprising a tool body inner portion and a tool body holding portion extending therefrom; the tool body holding portion having an imaginary holding plane and comprising opposing holding bottom and top ends, parallel opposing holding first and second side surfaces, each being connected to the holding bottom and top ends and each being located on a different side of the imaginary holding plane and being parallel thereto, and a holding front end located on an opposing side of the tool body holding portion from the tool body inner portion and being connected to the holding bottom and top ends and to the holding first and second side surfaces; the holding top end comprising an insert pocket defined only by an insert pocket first support area oriented transverse relative to the holding plane and connected to the holding first and second side surfaces and the holding front end, and an insert pocket second support area spaced apart from the holding front end and oriented transverse relative to both the insert pocket first support area and the holding plane; the tool body holding portion further comprising a fastener bore opening out to the insert pocket first support area, and a screw bore intersecting the fastener bore; wherein the holding top end comprises a holding interlocking arrangement at the insert pocket first support area which extends in a direction along the holding plane and which is configured for preventing lateral movement of a cutting insert mounted thereon in a direction transverse to the holding plane.

In accordance with yet another aspect of the subject matter of the present application, there is provided a cutting tool assembly comprising a cutting tool body having an insert pocket, a fastener bore opening out to the insert pocket, a screw bore and a biasing bore, a fastener, a biasing screw receivable into the screw bore and comprising a threaded body portion and a screw actuator portion, and a biasing arrangement; the fastener comprising a fastener body receivable into the fastener bore and being formed with fastener body first and second recesses, and a fastener head configured for securing a cutting insert to the insert pocket; the fastener body second recess comprising a second recess first abutment surface extending inwardly from a fastener peripheral surface of the fastener body, and a second recess second abutment surface extending from the second recess first abutment surface to the fastener peripheral surface and being further than the second recess first abutment surface from the fastener head; the fastener body first recess being configured for engagement by the screw actuator portion to urge the fastener head in a direction towards the insert pocket; the biasing arrangement being receivable into the biasing bore and comprising a biasing member and a biasing spring configured to urge the biasing member against the fastener body; the biasing member comprising a biasing member first surface configured to engage the second recess first abutment surface and thereby urge the fastener head in a direction away from the insert pocket, and a biasing member second surface extending transversely to the biasing member first surface and configured to engage the second recess second abutment surface and prevent ejection of the fastener from the insert pocket.

In accordance with still a further aspect of the subject matter of the present application, there is provided a cutting tool assembly comprising, in combination, a cutting insert having any of the features described hereinabove and below, and a cutting tool body having any of the features described hereinabove and below and which further comprises a fastener, a biasing screw and a biasing arrangement; the fastener comprising a fastener body disposed in the fastener bore and being formed with fastener body first and second recesses, and a fastener head configured for securing the cutting insert to the insert pocket; the fastener body second recess comprising a second recess first abutment surface extending inwardly from a fastener peripheral surface of the fastener body, and a second recess second abutment surface extending from the second recess first abutment surface to the fastener peripheral surface; the second recess second abutment surface being further than the second recess first abutment surface from the fastener bore; the biasing screw comprising a threaded body portion, and an actuator portion engageable with the fastener body first recess for causing the fastener head to move towards the insert pocket; the biasing arrangement being disposed in the biasing bore and comprising a biasing member and a biasing spring configured to urge the biasing member against the fastener body; the biasing member comprising a biasing member first surface configured to engage the second recess first abutment surface to urge the fastener head in a direction away from the insert pocket, and a biasing member second surface extending transversely to the biasing member first surface and configured to engage the second recess second abutment surface to prevent ejection of the fastener from the insert pocket.

In accordance with other aspects of the subject matter of the present application, there is provided a clamping mechanism or a cutting tool fastener or a cutting tool biasing arrangement, having any of the features described hereinabove or below.

It will be understood that the above-said is a summary, and that any of the aspects above may further comprise any of the features described in connection with any of the other aspects or described hereinbelow. Specifically, the following features, either alone or in combination, may be applicable to any of the above aspects:

A. Each aperture first and second side surfaces can be devoid of a clamping lip.
B. Both aperture first and second end surfaces can be formed with a clamping lip.
C. Each clamping lip can comprise a projecting portion which projects furthest into an insert aperture at a location between, and spaced apart from, insert top and bottom surfaces.
D. An insert third intersection can be defined at an intersection of an insert bottom surface, an insert first end surface and an insert first side surface.
E. An insert fourth intersection can be defined at an intersection of an insert bottom surface, an insert first end surface and an insert second side surface.
F. An insert first intersection can be closer to an insert third intersection than an insert second intersection is to an insert fourth intersection.
G. An insert bottom surface can be formed with an insert interlocking arrangement for preventing lateral movement of a cutting insert in a direction transverse to an insert longitudinal axis.
H. An interlocking arrangement can comprise a groove formed in an insert bottom surface and extending in a direction along an insert longitudinal axis. The groove can be formed with a groove major recess and a groove clearance recess on each side thereof. Each groove clearance recess can extend between a groove major recess and an insert bottom surface.
I. In a plan view of an insert top surface, no part of the cutting insert projects further than said cutting edge or a specific cutting edge, in a direction transverse to an insert longitudinal axis.
J. An insert wall can be defined between insert top and bottom surfaces, an aperture first side surface and an insert first side surface.
K. An insert wall can comprise an insert first wall portion and an insert second wall portion located between the insert first wall portion and an insert first end surface.
L. Insert first and second wall portions can have respective insert first and second wall portion widths. Insert first and second wall portion widths can each being measured from an aperture first side surface to an insert first side surface in a direction perpendicular to an insert longitudinal axis; and the insert first wall portion width has a greater magnitude than the insert second wall portion width.
M. A cutting insert can comprise insert first and second walls. An insert first wall can be defined between insert top and bottom surfaces, an aperture first side surface and an insert first side surface. An insert second wall can be defined between insert top and bottom surfaces, an aperture second side surface and an insert second side surface.
N. Each of insert first and second walls can have an insert minimum wall width measured in a direction perpendicular to an insert longitudinal axis. An insert minimum wall width can have a magnitude of greater than or equal to 0.7 mm.
O. An insert maximum width, measured from an insert first side surface to an insert second side surface in a direction perpendicular to an insert longitudinal axis, can have a magnitude of less than 5 mm.
P. Oblong shapes of an insert aperture and cutting insert can both rectangles.
Q. An insert aperture can be oval shaped and a cutting insert can be a rectangular.
R. A cutting insert can have 180 degrees rotational symmetry about an insert aperture axis which extends in a direction perpendicular to an insert longitudinal axis and through a center of an insert aperture.
S. A holding interlocking arrangement can comprise holding interlocking arrangement first and second portions disposed on different sides of a fastener bore.
T. A holding interlocking arrangement first portion can have a holding interlocking arrangement first portion maximum width dimension which is greater in magnitude than a holding interlocking arrangement second portion maximum width dimension, both of which being measurable along a holding width axis perpendicular to a holding plane.
U. An insert pocket first support area can be slanted with respect to a holding plane.
V. An insert pocket first support area can comprise a longitudinally extending support area first slanted portion which is connected to and forms an obtuse seating surface first internal angle with a holding first side surface, and extends to a support area second slanted portion and forms an obtuse seating surface second internal angle with a support area first slanted portion.
W. A holding interlocking arrangement can be in the form of a ridge.
X. A tool body holding portion can comprise a biasing bore intersecting a fastener bore.
Y. A biasing bore and a screw bore can be coaxial.

Z. In a plan view of a fastener top surface at a clamped position of a cutting tool assembly, a fastener head can be elongated in a direction along a holding plane.

AA. A fastener head can be configured to simultaneously clamp a cutting insert's first and second clamping lips which are spaced apart along a holding plane.

BB. A fastener head, at a clamped position of a cutting tool assembly, can be spaced apart from both aperture first and second side surfaces.

CC. In a plan view of a cutting insert, at a clamped position of a cutting tool assembly, each cutting edge of the cutting insert can extend in a direction perpendicular to a holding plane.

DD. A second recess first abutment surface and a biasing member first surface can be both flat and parallel to each other, for preventing rotational motion of a fastener when engaging a biasing member.

EE. A biasing member and fastener can be configured to contact each other in both unclamped and clamped positions and any intermediary position therebetween.

FF. A fastener body first recess can comprise a first recess first sub-portion which extends from, and forms an obtuse internal first recess first angle with, a fastener peripheral surface, and extends to, and forms an obtuse internal first recess second angle with, a first recess second sub-portion.

GG. A fastener body first recess can comprise a first recess first sub-portion which faces in a direction of translational movement of a biasing screw along a holding length axis, and a first recess second sub-portion surface which extends into the fastener from the first recess first sub-portion and is slanted with respect to the direction of translational movement of the biasing screw.

BRIEF DESCRIPTION OF THE DRAWINGS

For a better understanding of the subject matter of the present application, and to show how the same may be carried out in practice, reference will now be made to the accompanying drawings, in which.

DETAILED DESCRIPTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 1:
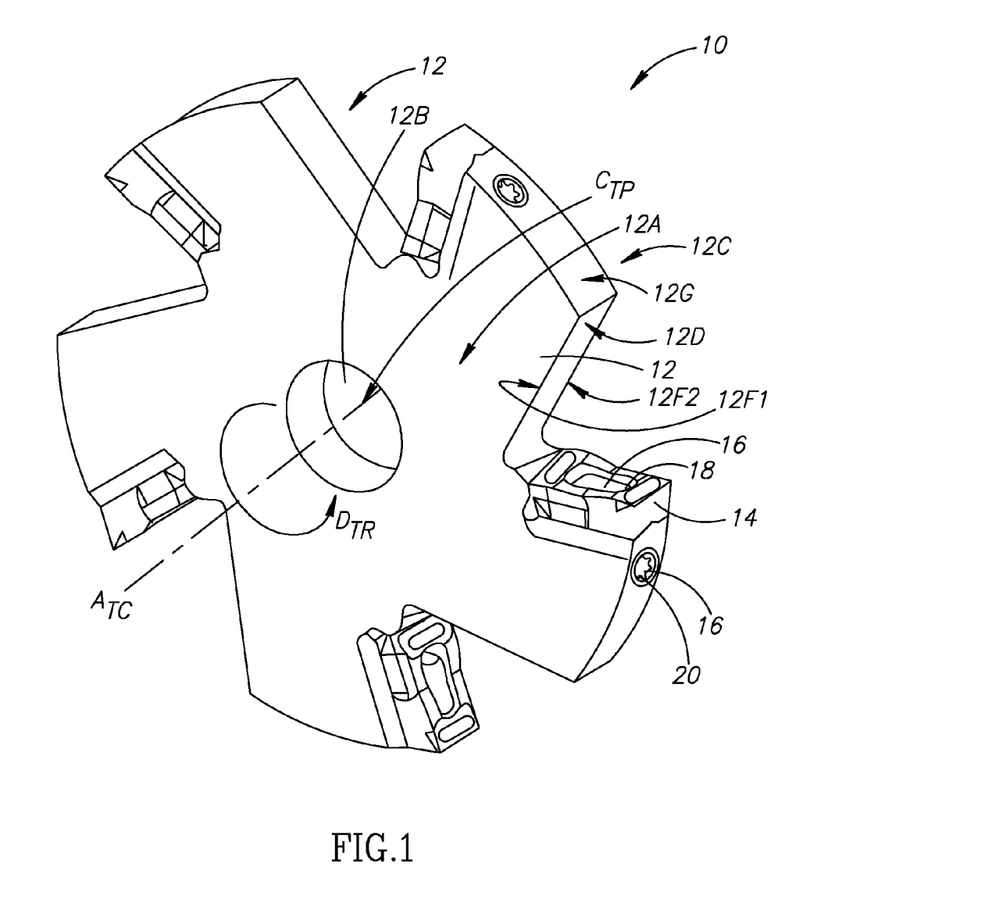
FIG. 1 is a perspective view of a cutting tool assembly.
Figure 2A:
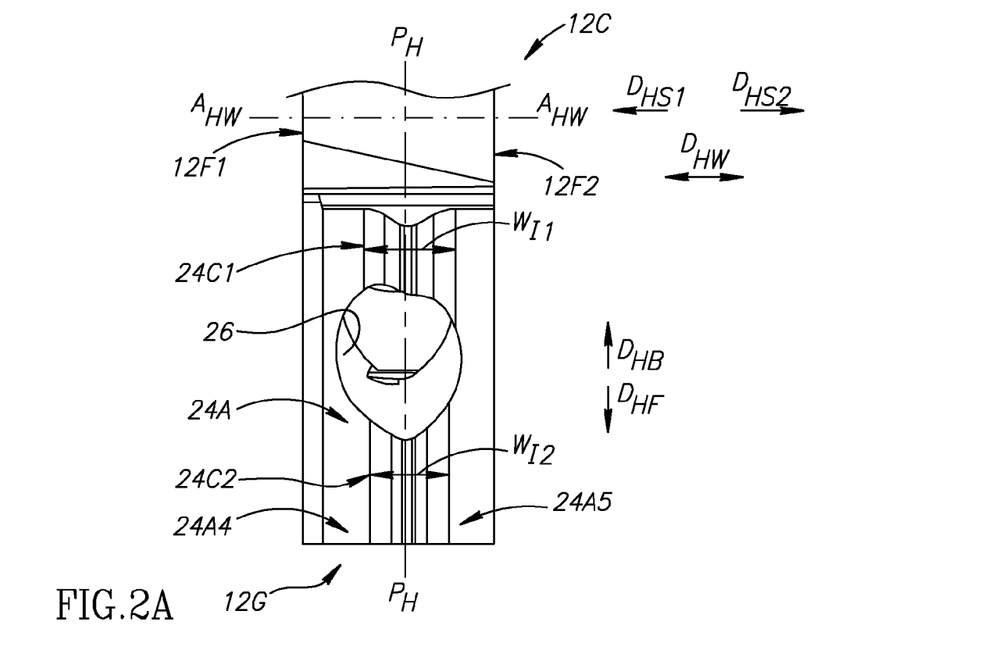
FIG. 2A is a plan view of a tool body holding portion of the cutting tool assembly in FIG. 1.
Figure 2B:
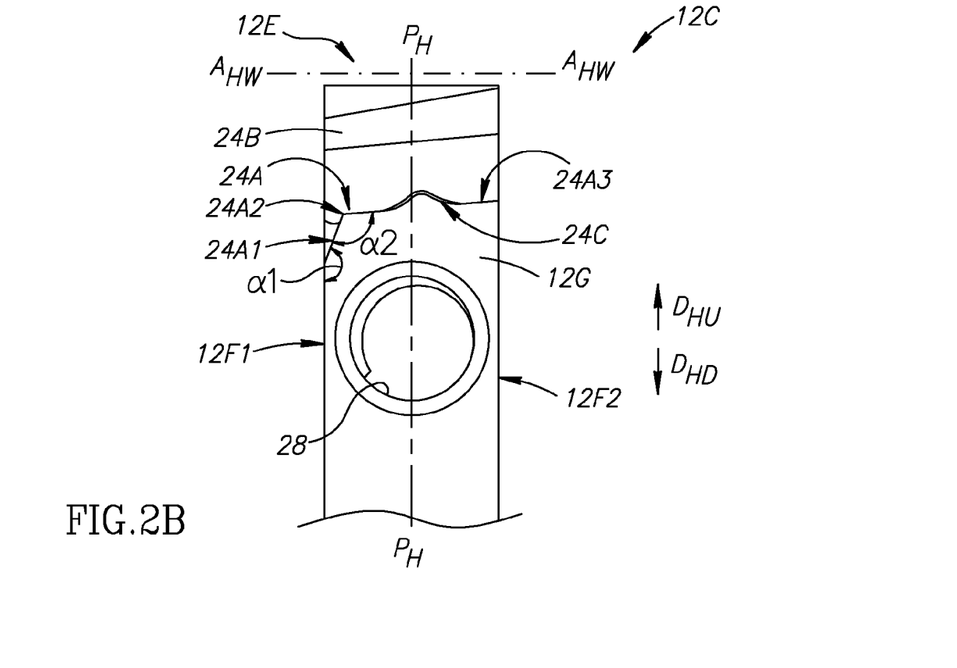
FIG. 2B is a front view of the tool body holding portion in FIG. 2A.
Figure 5A:
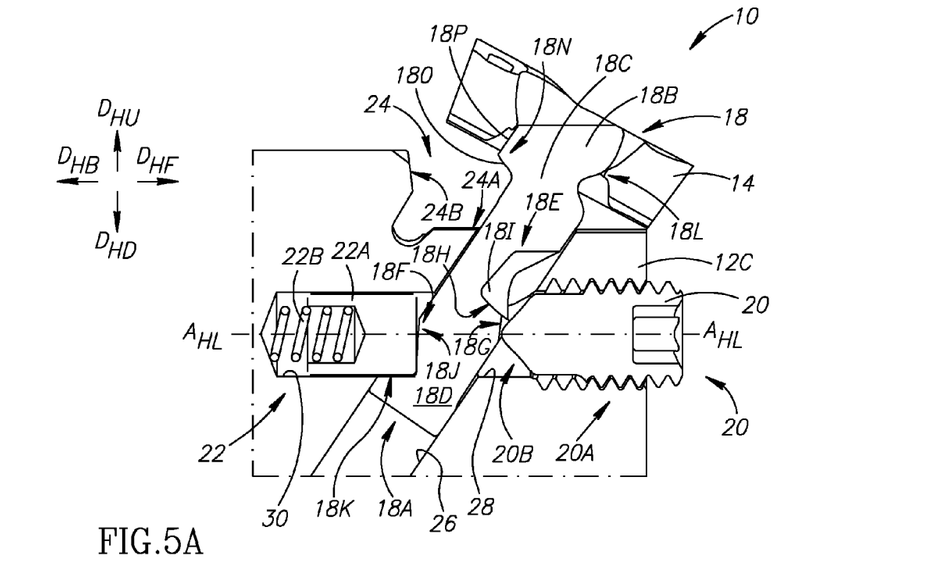
FIG. 5A is a partial side view of a tool body holding portion and clamping mechanism in FIG. 1, in an unclamped position.

Reference is made to FIG. 1, showing a cutting tool assembly 10 for metal cutting operations and comprising a cutting tool body 12, one or more cutting inserts 14, each of which is securable to the cutting tool body 12 through a respective clamping mechanism 16 which comprises a fastener 18, a biasing screw 20 and a biasing arrangement 22 (FIG. 5A).

In this non-limiting example, the cutting tool assembly 10 is a rotary tool, specifically a rotary slot metal-cutting tool, configured for rotation in a counterclockwise tool rotation direction $D_{TR}$ (in the view shown in FIG. 1) about a tool central axis $A_{TC}$ which passes through a tool center point $C_{TP}$ of the cutting tool body 12. It is understood that a cutting tool assembly in accordance with the subject matter of the present application could also be a non-rotary tool, for example of the rectangular blade type, configured for cutting a moving workpiece. It is also understood that such rotary or non-rotary tool could have a single cutting insert 14 secured to the cutting body thereof, or, in accordance with design requirements, a plurality of cutting inserts.

The cutting tool body 12 can comprise a tool body inner portion 12A, which in this non-limiting example is disc-shaped and formed with an inner body central aperture 12B, and at least one tool body holding portion 12C extending from a periphery of the tool body inner portion 12A. In this non-limiting example, there is a plurality of tool body holding portions 12C which are each circumferentially spaced about the tool body inner portion 12A.

Referring also to FIGS. 2A, 2B, and 4A to 5B, the tool body holding portion 12C can comprise opposing holding bottom and top ends 12D, 12E (FIGS. 1 and 2B, respectively), parallel opposing holding first and second side surfaces 12F1, 12F2, and a holding front end 12G located on an opposing side of the tool body holding portion 12C from the tool body inner portion 12A.

Each of the holding first and second side surfaces 12F1, 12F2, can be connected to the holding bottom and top ends 12D, 12E. Each of the holding first and second side surfaces 12F1, 12F2, can be located on a different side of, and parallel with, an imaginary holding plane $P_H$. In this non-limiting example, the holding plane $P_H$ bisects the tool body holding portion 12C, i.e. it is located an equal distance from each of the holding first and second side surfaces 12F1, 12F2.

A holding width axis $A_{HW}$ (FIG. 2A) extends perpendicular to the holding plane $P_H$, and defines oppositely directed holding sideward first and second directions $D_{HS1}$, $D_{HS2}$. Similarly, in the plan view of FIG. 2A, the holding plane $P_H$ defines opposite holding forward and backward directions $D_{HF}$, $D_{HB}$, and, in the front view of FIG. 2B, the holding plane $P_H$ defines opposite holding upward and downward directions $D_{HU}$, $D_{HD}$.

The holding front end 12G can be connected to the holding bottom and top ends 12D, 12E and to the holding first and second side surfaces 12F1, 12F2. The holding front end 12G can comprise an insert pocket 24 (FIG. 5A).

The insert pocket 24 can comprise insert pocket first and second support areas 24A, 24B, and a holding interlocking arrangement 24C found within the footprint of support area 24A.

The insert pocket first support area 24A can be oriented transverse relative to the holding plane $P_H$ and connected to the holding first and second side surfaces 12F1, 12F2 and the holding front end 12G. Stated differently, the insert pocket first support area 24A can be oriented to face in the holding upward direction $D_{HU}$. More precisely, the insert pocket first support area 24A can be slanted with respect to the holding plane $P_H$. Even more precisely, the insert pocket first support area 24A can comprise a longitudinally extending support area first slanted portion 24A1 extending from the holding first side surface 12F1, a support area second slanted portion 24A2 connected to the insert pocket first support area 24A and the holding interlocking arrangement 24C, and a support area third slanted portion 24A3 connected to the holding interlocking arrangement 24C and the holding second side surface 12F2.

The support area first slanted portion 24A1 can form an obtuse seating surface first internal angle α1 with the holding first side surface 12F1, which can, possibly, facilitate efficient chip flow thereacross. The support area second slanted portion 24A2 can form an obtuse seating surface second internal angle α2 with the support area first slanted portion 24A1. The support area third slanted portion 24A3 can be coplanar with the support area second slanted portion 24A2. As best shown in FIG. 4B, the slant of the support area second and third slanted portions 24A2, 24A3 can be configured to facilitate a cutting edge 14F1 of the cutting insert 14 to be oriented perpendicular to the holding plane $P_H$, which can, possibly, increase cutting efficiency.

Figure 5B:
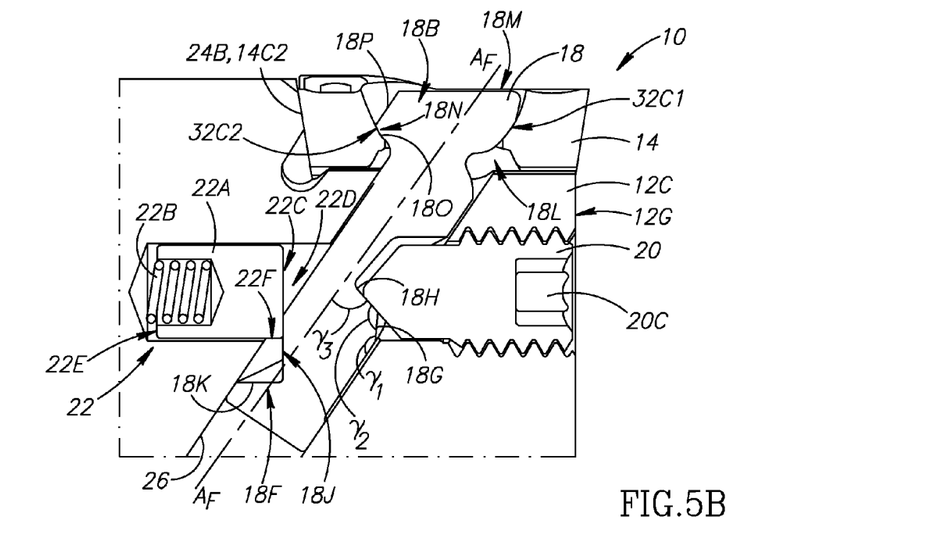
FIG. 5B is a partial side view of the tool body holding portion and clamping mechanism in FIG. 5A, in a clamped position.

The insert pocket second support area 24B can be spaced apart from the holding front end 12G. More precisely, it can be located between the holding front end 12G and the tool body inner portion 12A. The insert pocket second support area 24B can be oriented transverse relative to both the insert pocket first support area 24A and the holding plane $P_H$. Stated differently, the insert pocket second support area 24B can be oriented to face in the holding forward direction $D_{HF}$. As best seen in FIG. 5A, in this non-limiting example, the insert pocket second support area 24B is also slanted in the holding upward and backward directions $D_{HU}$, $D_{HB}$. Such slanting can be configured to complement a slant of a complementary surface 14C2 of the cutting insert 14, as shown in FIG. 5B.

The insert pocket 24 can be defined only by the insert pocket first support area 24A and the insert pocket second support area 24B. To elaborate, the insert pocket 24 can be devoid of additional surfaces or walls, for example such as side surfaces or walls extending in the holding upward direction $D_{HU}$ from the holding first and second side surfaces 12F1, 12F2 or from the holding front end 12G. Thus, the insert pocket is devoid of any support areas which extend along the length of either side surface 12F1, 12F2 and provide support in the direction transverse to the imaginary holder plane $P_H$ and along the tool central axis $A_{TC}$. To this extent, the insert pocket 24 can comprise exactly, and only, two support areas configured to abut the cutting insert 14. It is understood, however, that each of these two support areas, the insert pocket first support area 24A and the insert pocket second support area 24B, may each comprise one or more discrete support area surfaces, as discussed herein.

Referring now to FIG. 5A only, the tool body holding portion 12C also comprises a fastener bore 26, a screw bore 28, and a biasing bore 30.

The fastener bore 26 opens out to the insert pocket first support area 24A, and can extend into the tool body holding portion 12C in a slanted manner along the downward and backward directions $D_{HD}$, $D_{HB}$.

The screw bore 28 comprises an internal threading. The screw bore 28 can open out to the holding front end 12G and can extend into the tool body holding portion 12C in the backward directions $D_{HB}$ until it intersects the fastener bore 26.

The biasing bore 30 intersects the fastener bore 26 and extends therefrom into the tool body holding portion 12C, which, in this non-limiting example, is an extension in the backward direction $D_{HB}$.

In this non-limiting example, the biasing bore and the screw bore are coaxial along a common holding length axis A. The holding length axis $A_{HL}$ can define forward and backward directions of translational movement of the biasing screw 20, which, in this non-limiting example, correspond to the holding forward and backward directions $D_{HF}$, $D_{HB}$ (FIG. 5A). The holding length axis $A_{HL}$ can lie on the holding plane $P_H$.

The holding interlocking arrangement 24C can include a groove or ridge. In this non-limiting example, the holding interlocking arrangement 24C is in the form of a ridge. More precisely, the interlocking arrangement or ridge 24C can comprise interlocking arrangement first and second portions 24C1, 24C2 disposed on opposing sides of the fastener bore 26. The interlocking arrangement first portion 24C1 can have an interlocking arrangement first portion maximum width $W_{I1}$ dimension which is greater in magnitude than an interlocking arrangement second portion maximum width dimension $W_{I2}$, both being measurable along the holding width axis $A_{HW}$. A varied width of the interlocking arrangement 24C can facilitate a stable seating arrangement for the cutting insert 14. More specifically, such varied width can cause the cutting insert 14 to abut or rest on the interlocking arrangement first portion 24C1 and the insert pocket first support area 24A, and at two abutment points 24A4, 24A5 on opposing sides of the interlocking arrangement second portion 24C2 which can be directly adjacent the holding front end 12G and to the holding first and second side surfaces 12F1, 12F2 for increased stability.

The interlocking arrangement 24C can extend in a direction along the holding plane $P_H$ and can be configured for preventing lateral movement of an insert mounted thereon in a direction transverse to the holding plane $P_H$ (for example in the holding sideward first and second directions $D_{HS1}$, $D_{HS2}$). The interlocking arrangement 24C can have a cross section, taken perpendicular to the holding plane $P_H$, which has tapered shape.

Figure 3A:
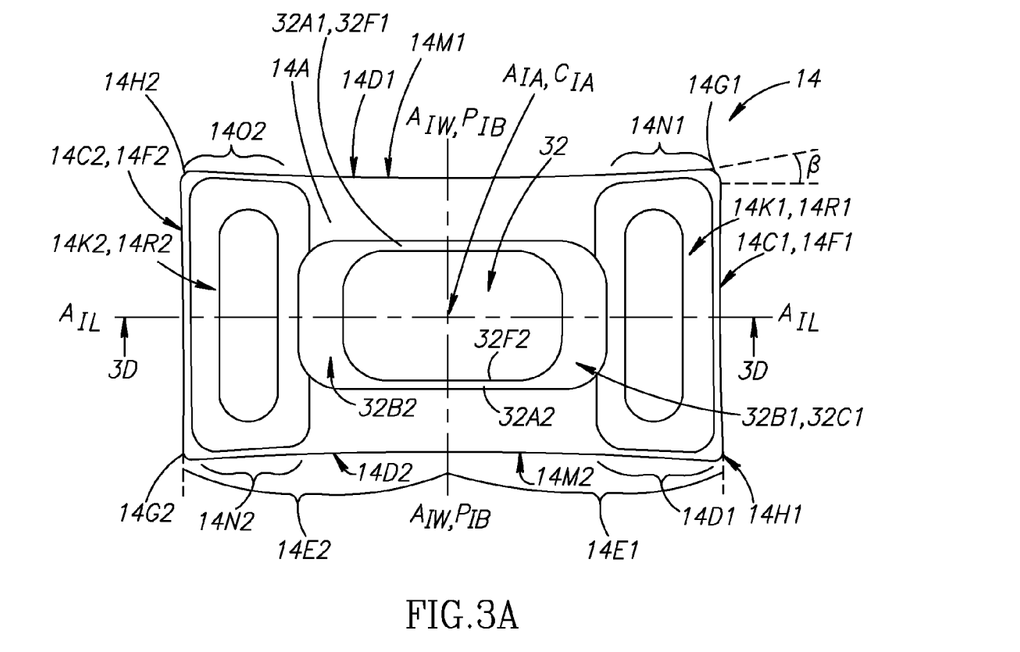
FIG. 3A is a plan view of a cutting insert of the cutting tool assembly in FIG. 1.
Figure 3B:
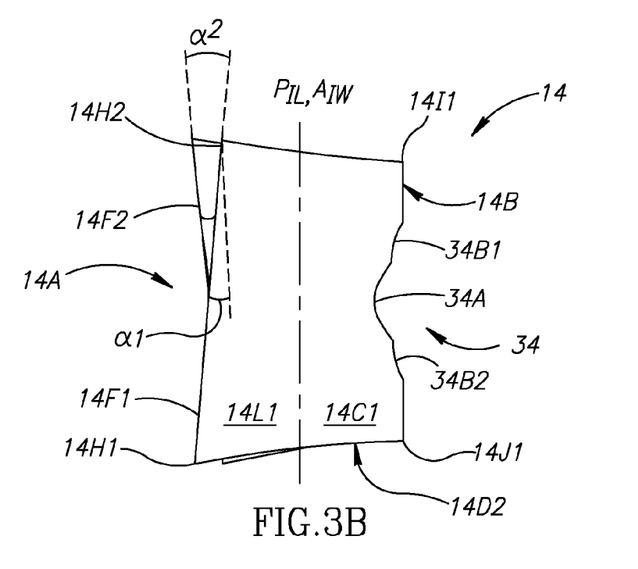
FIG. 3B is a front view of the cutting insert in FIG. 3A.
Figure 3C:
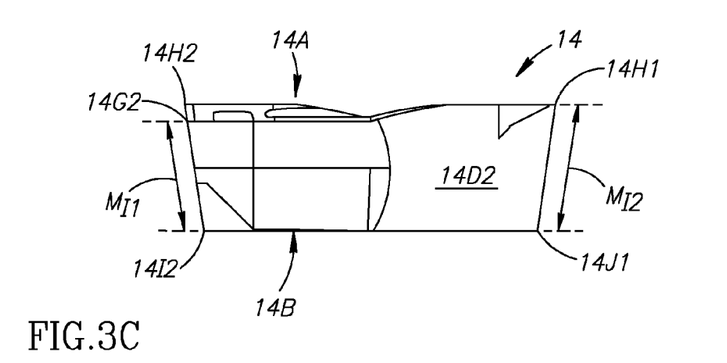
FIG. 3C is a side view of the cutting insert in FIGS. 3A and 3B.
Figure 3D:
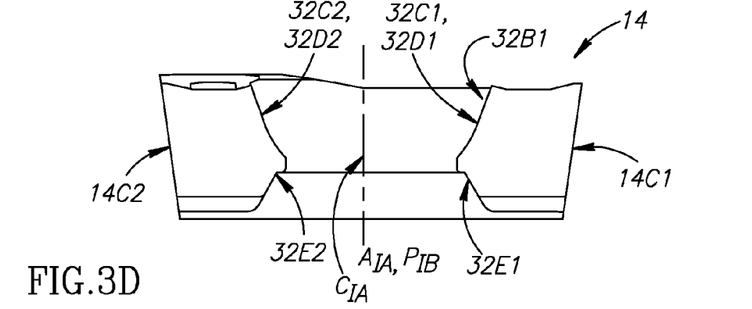
FIG. 3D is a cross section view taken along line 3D-3D in FIG. 3A.
Figure 3E:
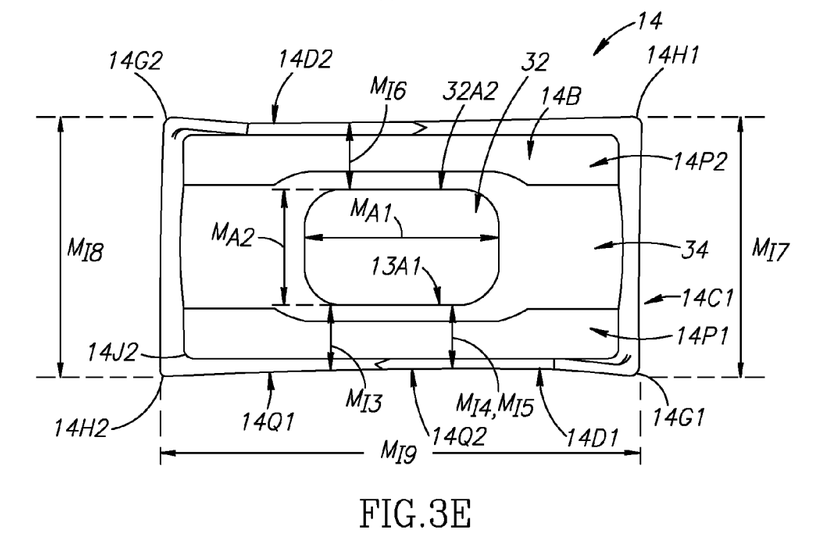
FIG. 3E is a bottom view of the cutting insert in FIGS. 3A to 3D.

Referring to FIG. 3E, the cutting insert 14 will be described in detail, with shapes described being made with specific reference to the plan view of the insert top surface shown in FIG. 3A, unless stated otherwise.

The cutting insert 14 can be made of an extremely hard and wear-resistant material such as cemented carbide, either by form-pressing and then sintering carbide powders in a binder or by powder injection molding methods.

The cutting insert 14 comprises opposing insert top and bottom surfaces 14A, 14B (bottom surface 14B is shown in FIG. 3E) opposing insert first and second end surfaces 14C1, 14C2, each connected to the insert top and bottom surfaces 14A, 14B and opposing insert first and second side surfaces 14D1, 14D2, each connected to the insert top and bottom surfaces 14A, 14B and to the insert first and second end surfaces 14C1, 14C2.

The cutting insert 14 further comprises an insert aperture 32 opening out to the insert top and bottom surfaces 14A, 14B.

The cutting insert 14 and the insert aperture 32 both have oblong shapes which are elongated along a common insert longitudinal axis A. It is noted that, in this non-limiting example, the cutting insert 14 and the insert aperture 32 also have oblong shapes in a bottom view (FIG. 3E) and side/side sectional views (FIGS. 3C and 3D).

In this non-limiting example, the cutting insert 14 is a single-sided indexable insert having 180 degrees rotational symmetry about an insert aperture axis $A_{IA}$ which extends in a direction perpendicular to the insert longitudinal axis $A_{IL}$ (best seen in FIG. 3D) and through the insert aperture's center $C_{IA}$. In typical embodiments, the insert aperture axis $A_{IA}$ extends through the insert aperture's center $C_{IA}$ without intersecting any surfaces of the cutting insert 14 or the insert aperture 32. Stated differently the cutting insert 14 comprises two insert halves 14E1, 14E2 meeting at an insert bisection plane $P_{IB}$ extending along the insert width axis $A_{IW}$ and the insert aperture axis $A_{IA}$.

As will be described in further detail hereinafter with reference to FIG. 3B, in this non-limiting example, a first pair of diagonally opposed first and fifth intersections 14G1, 14G2 along the insert top surface 14A are a first magnitude of distance $M_{I1}$ from associated diagonally opposed third and seventh intersections 14I1, 14I2, respectively, at the insert bottom surface 14B. First intersection 14G1 is formed at an intersection of the insert top surface 14A, the insert first end surface 14C1 and the insert first side surface 14D1, while fifth intersection 14G2 is formed at an intersection of the insert top surface 14A, the insert second end surface 14C2 and the insert second side surface 14D2. Meanwhile, a second pair of diagonally opposed second and sixth intersections 14H1, 14H2 along the insert top surface 14A, are a second magnitude of distance $M_{I2}$ from associated diagonally opposed fourth and eighth intersections 14J1, 14J2, respectively, at the insert bottom surface 14B, $M_{I2}$ being larger than the first magnitude of distance $M_{I1}$. Second intersection 14H1 is formed at the intersection of the insert top surface 14A, the insert first end surface 14C1 and the insert second side surface 14D2, while sixth intersection 14H2 is formed at the intersection of the insert top surface 14A, the insert second end surface 14C2 and the insert first side surface 14D1. Thus, in this non-limiting example, the cutting insert 14 also has mirror asymmetry about the insert bisection plane $P_{IB}$.

Alternatively, a cutting insert in accordance with the subject matter of the present application can also be, for example, a single sided non-indexable insert.

For conciseness, the description of the cutting insert 14 below will primarily relate to only one of the two identical halves 14E1, 14E2 with the statements made being applicable, mutatis mutandis, to the other half, and common reference numerals suffixed alternatively with the numerals "1" or "2" also being an indication of identical construction.

Referring now to FIG. 3B, the cutting insert 14 further comprises a first cutting edge 14F1 (first end cutting edge) formed at the first end surface 14C1 and extending from the insert first intersection 14G1 to the insert second intersection 14H1.

The first cutting edge 14F1 can be any shape. In this non-limiting example, in both views of FIGS. 3A and 3B, the first cutting edge 14F1 is straight, however it could be curved or have both curved and straight sub-portions. As seen in the figures, first end cutting edge 14F1 extends along the entire cutting width $W_{C1}$ of the cutting insert 14.

Reverting to FIG. 3A, in this non-limiting example, at least a portion of the insert top surface 14A adjacent the first cutting edge 14F1 constitutes a first rake surface 14K1, and at least a portion of the insert first end surface 14C1 constitutes a relief surface 14L1 (FIG. 3B). Alternatively, it is also feasible that at least a portion of the insert first end surface 14C1 could constitute a rake surface and at least a portion of the insert top surface 14A could constitute a relief surface. In any case the rake surface 14K1 can be formed with a chip-control arrangement 14R1. In this non-limiting example, the chip-control arrangement 14R1 is configured as an elongated chip-control recess located between the insert aperture 32 and the insert first end surface 14C1, and which can extend in a direction perpendicular to the insert longitudinal axis $A_{IL}$, i.e. along the insert width axis $A_{IW}$.

Referring now to FIGS. 3B and 3C, the cutting insert's insert third intersection 14I1 is formed at an intersection of the insert bottom surface 14B, the insert first end surface 14C1 and the insert first side surface 14D1, while the insert's fourth intersection 14J1 is formed at an intersection of the insert bottom surface 14B, the insert first end surface 14C1 and the insert second side surface 14D2.

The insert first intersection 14G1 is a first magnitude of distance $M_{I1}$ from the third intersection 14I1 (shown in FIG. 3C relative to the identically spaced apart insert fifth and seventh intersections 14G2, 14I2), and the second intersection 14H1 is a second magnitude of distance $M_{I2}$ from the fourth intersection 14J1. In this non-limiting example, the second magnitude of distance $M_{I2}$ is greater than the first magnitude of distance $M_{I1}$.

In embodiments where a cutting edge follows a straight line in a plan view of an insert first end surface it can be slanted at a predetermined angle. In this non-limiting example, in FIG. 3B, the first cutting edge 14F1 is shown to be slanted at an acute cutting edge first angle α1 relative to an imaginary insert longitudinal plane $P_{IL}$ defined by the insert width axis $A_{IW}$ and the insert longitudinal axis A. Similarly, when both follow a straight line in a plan view of the insert first end surface 14C1, the first cutting edge 14F1 can form together with the second cutting edge 14F2, in such view, an acute cutting edge angle second angle α2. The cutting edge first angle α1 can be between 0 to 30°. If the cutting insert has 180 degree rotational symmetry about the insert aperture axis $A_{IA}$, the cutting edge angle second angle α2 will be twice the cutting edge first angle α1. As can be seen from FIG. 3B, first and second end cutting edges 14F1, 14F2 both extend in a direction transverse to the insert's longitudinal axis $A_{IL}$ and along the entire cutting width $W_{C1}$ of the cutting insert 14.

In all cases, the cutting insert 14 can comprise non-cutting edge portions 14M1, 14M2. For example, as best seen in FIG. 3A, edges of the insert top surface which intersect with portions of the insert first and second side surfaces, which do not include insert first and second side surface extremity portions 14N1, 14O1 as further described hereinbelow, can constitute non-cutting edge portions. Non-cutting edges portion 14M1, 14M2 are defined as edge portions which are devoid of a form and/or structural strength configured for cutting metal workpieces (not shown).

A possible advantage of an insert comprising non-cutting edge portions interposed between cutting edges, can be that they ensure that a cutting insert, when indexed, can start cutting with a cutting edge which has not been, even partially, previously used.

It is also noted that, in the view of FIG. 3A, no part of the cutting insert 14 projects further than the first cutting edge 14F1 in directions transverse to the insert longitudinal axis $A_{IL}$. Additionally, as shown in FIGS. 3B and 3C, the insert first and second side surfaces 14D1, 14D2 and insert first and second end surfaces 14C1, 14C2 can be formed with a linear tapered shape from the insert top surface 14A to the insert bottom surface 14B.

Referring now to FIG. 3E, an insert first wall 14P1 can be defined between the insert top and bottom surfaces 14A, 14B the aperture first side surface 32A1 and the insert first side surface 14D1, and an insert second wall 14P2 can be defined between the insert top and bottom surfaces 14A, 14B the aperture second side surface 32A2 and the insert second side surface 14D2.

The insert first wall 14P1 can comprise an insert first wall portion 14Q1 and an insert second wall portion 14Q2 located between the insert first wall portion 14Q1 and the insert first end surface 14C1. The insert first and second wall portions 14Q1, 14Q2 can have respective insert first and second wall portion widths $M_{I3}$, $M_{I4}$. The insert first and second wall portion widths $M_{I3}$, $M_{I4}$ can each be measured from the aperture first side surface 32A1 to the insert first side surface 14D1 in a direction perpendicular to the insert longitudinal axis $A_{IL}$, i.e. along the insert width axis $A_{IW}$. A maximum width of the insert first wall portion 14Q1 can have a greater magnitude than a maximum width of the insert second wall portion 14Q2.

Each of the insert first and second walls 14P1, 14P2 can have an insert first and second minimum wall widths $M_{I5}$, $M_{I6}$ measurable from the aperture first side surface 32A1 to the insert first side surface 14D1 or the aperture second side surface 32A2 to the insert second side surface 14D2. Each of the insert minimum first and second wall widths $M_{I5}$, $M_{I6}$ can have a magnitude of greater than or equal to 0.7 mm for withstanding cutting forces.

Even while maintaining such minimum wall width, the overall width of a cutting insert, in accordance with the subject matter of the present application, can be very small. More precisely, an insert first maximum width $M_{I7}$ is measurable at the widest portion of the cutting insert 14, which in this non-limiting example is from the insert first intersection 14G1 to the insert second intersection 14H1 (or the identical insert second maximum width $M_{I8}$). In quantitative terms, an insert maximum width $M_{I7}$, $M_{I8}$ can have a magnitude of less than 5 mm.

Reverting to FIG. 3B, the insert bottom surface 14B can be formed with an insert interlocking arrangement 34 for preventing lateral movement of the cutting insert 14 in a direction transverse to the insert longitudinal axis $A_{IL}$. The interlocking arrangement 34 can be configured as a groove formed in the insert bottom surface 14B and extending in a direction along the insert longitudinal axis $A_{IL}$. The groove 34 can be formed with a groove major recess 34A and a groove clearance recess 34B1, 34B2 on each side thereof. Each groove clearance recess 34B1, 34B2 of cutting insert 14 can extend between the major recess 34A and the insert bottom surface 14B.

It will be understood that the interlocking arrangement 34 could be a groove or a projecting element such as a ridge. However, it has been found that a groove may be advantageous when grinding of the bottom surface 14B of the cutting insert 14 is desired.

A possible advantage of such construction, can be that a cutting insert 14 may be provided which is configured to cut (by slotting, grooving, etc.) shapes having a width which is extremely narrow relative to the depth thereof. Stated differently, the aligned elongated shapes of the cutting insert 14 and the insert aperture can provide the insert with a relatively small insert maximum width, measured from the insert first side surface 14D1 to the insert second side surface 14D2 in a insert width direction in a direction along an insert width axis $A_{IW}$ which is perpendicular to both the insert longitudinal axis $A_{IL}$ and an insert aperture axis $A_{IA}$ (FIG. 3D) which extends through the center of the insert aperture and in a direction perpendicular to the insert longitudinal axis $A_{IL}$.

Referring now to FIGS. 3A and 3D, the insert aperture 32 can further comprise opposing aperture first and second side surfaces 32A1, 32A2, each extending along the insert longitudinal axis $A_{IL}$, and opposing aperture first and second end surfaces 32B1, 32B2.

The aperture first and second end surfaces 32B1, 32B2 can each be connected to the aperture first and second side surfaces 32A1, 32A2 and can extend transverse to the insert longitudinal axis $A_{IL}$.

The aperture first end surface 32B1 is the closest surface of the insert aperture relative to the first cutting edge 14F1. The aperture second end surface 32B2 is the furthest surface of the insert aperture relative to the first cutting edge 14F1.

Referring to the bottom view of the insert bottom surface 14B shown in FIG. 3E (noting that the following statements are correct for the view seen in FIG. 3A as well), the oblong shapes of the cutting insert 14 and insert aperture 32 are shown.

More precisely, an insert minimum magnitude of length $M_{I9}$, measurable between closest points of the insert first and second end surfaces 14C1, 14C2 (measured along the insert longitudinal axis $A_{IL}$) is greater than the insert first or second magnitude of maximum widths $M_{I7}$, $M_{I8}$ measurable between distal points of the insert first and second side surfaces and perpendicular to the insert longitudinal axis A. Similarly, an aperture magnitude of length $M_{A1}$ measurable between the aperture first and second end surfaces 32B1, 32B2 (measured parallel to the insert longitudinal axis $A_{IL}$) is greater than an aperture magnitude of width $M_{A2}$ measurable between the aperture first and second side surfaces 32A1, 32A2 (measured perpendicular to the insert longitudinal axis $A_{IL}$). It is also noticed that, in this non-limiting example, the aperture magnitude of width $M_{A2}$, has a magnitude greater than each of the insert first and second wall portion widths $M_{I3}$, $M_{I4}$, respectively.

Regarding the oblong shape of the cutting insert 14, a majority of the insert first and second side surfaces 14D1, 14D2 (in this non-limiting example constituted by the non-cutting edge portions 14M1, 14M2) and the insert first and second end surfaces 14C1, 14C2 are shown to be parallel to each other, and therefore the cutting insert 14 oblong shape could be considered as being, more specifically, rectangular. It is noticed that minor portions of the insert first and second side surfaces 14D1, 14D2, namely the insert side surface extremity portions 14N1, 14O1, which are located adjacent to the insert first and second end surfaces 14C1, 14C2, form an acute insert side surface angle f3 with the remainder portions of the insert first and second side surfaces, which in this non-limiting example are constituted by the non-cutting edge portions 14M1, 14M2. Additionally, it is noticed that the corners formed at the insert first and second intersections 14G1, 14H1, and similar cutting insert 32 intersections are shown to be curved and to project slightly outwardly from the insert end and side surfaces 14C1, 14C2, 14D1, 14D2. Notwithstanding that there exists some nonlinearity of the side surfaces, and that the corners project slightly outward, the peripheral edge of the cutting insert 14 is considered to form a rectangle, when compared with any other regular shapes such as a circle, triangle, square, pentagon, etc. Similarly, the peripheral edge of the insert aperture is considered as forming an oval shape (which could, in another embodiment, be, for example, rectangular). Consequently for the purposes of the specification and claims, when a cutting insert 14 and/or an insert aperture 32 are defined as having oval or rectangular shape (as shown in FIG. 3A), this definition is to be considered as comparative to other regular shapes.

Referring to FIG. 3D, the aperture first end surface 32B1 is formed with a first clamping lip 32C1. In this non-limiting example, the first clamping lip 32C1 extends along the aperture first end surface 32B1 in a direction perpendicular to the insert longitudinal axis A. The first clamping lip 32C1 can be configured with a first clamping lip upper abutment portion 32D1 which is slanted relative to the insert bisection plane $P_{IB}$ and is closer to the insert aperture's center $C_{IA}$ at axial locations closer to the insert bottom surface 14B than the insert top surface 14A. In other words, the first clamping lip upper abutment portion 32D1 slants inwardly and downwardly toward insert bisection plane $P_{IB}$ from the insert top surface 14A in a side cross-sectional view). The first clamping lip 32C1 can have a projecting portion 32E1 which projects furthest into the insert aperture. The projecting portion 32E1 can be located between, and spaced apart from, the insert top and bottom surfaces 14A, 14B. In the present view, the first clamping lip 32C1 is shown to have a tapering shape.

Notably, the aperture first and second side surfaces 32A1, 32A2 can each be devoid of a clamping lip. Such construction can allow a thinner cutting insert construction. It will be understood that aperture side projections 32F1, 32F2 shown formed on the aperture first and second side surfaces 32A1, 32A2 are optional and are provided for ease of manufacturing, and, in any case, do not sufficiently project into the insert aperture 32 to function as clamping lips.

It will be understood that where such clamping mechanism 16 is intended to be used in an application where a narrow/deep cut is not required, any cutting insert, including one having clamping lips located on other surfaces of an aperture thereof (not shown), may be suitable.

In all cases, the insert aperture 32 can be devoid of a threading arrangement.

Referring now to FIGS. 4A to 5B, the clamping mechanism 16 will be described in more detail.

The fastener 18 comprises a fastener body 18A (shown disposed in the fastener bore 26 in FIG. 5B) and a fastener head 18B configured for securing the cutting insert 14 to the insert pocket 24. The fastener 18 can further comprise a fastener neck 18C, connecting the fastener head 18B to the fastener body 18A, the fastener neck 18C having a smaller diameter than the fastener head 18B or the fastener body 18A.

The fastener body 18A being disposed in the fastener bore 26 and being formed with an optionally cylindrical, fastener peripheral surface 18D, and fastener body first and second recesses 18E, 18F extending into the fastener body 18A from the fastener peripheral surface 18D.

The fastener body 18A can be elongated. In the clamped position shown in FIG. 5B, the fastener body 18A and fastener bore 26 are coaxial along a common fastener axis $A_F$.

The fastener body first recess 18E can comprise an optionally flat, first recess first sub-portion 18G, which extends from, and forms an obtuse internal first recess first angle $\gamma_1$ with, the fastener peripheral surface 18D and extends to, and forms an obtuse internal first recess second angle $\gamma 2$ with, a second sub-portion surface (18I). In this non-limiting example, the first recess first sub-portion 18G faces a direction of translational movement of the biasing screw which is along the holding longitudinal axis $A_{HL}$, and the second sub-portion surface (18I) is slanted with respect to the holding longitudinal axis $A_{HL}$.

The fastener body first recess 18E can be configured for engagement by the screw thread to urge the fastener head 18B in at least the holding downward direction $D_{HD}$. The fastener body first recess 18E can comprise a first recess second sub-portion 18H which comprises a second sub-portion surface 18I. The second sub-portion surface 18I can extend deeper into the fastener body 18A from the first recess first sub-portion 18G and form an internal, acute, fastener first recess angle $\gamma_1$ therewith. The second sub-portion surface 18I can be located closer than the first recess first sub-portion 18G to the fastener head 18B. The fastener first recess second sub-portion 18H can have a tapered shape which corresponds to a shape of a complementary screw actuator portion 20B configured for engagement therewith.

It is understood that if the first recess first sub-portion 18G would not be present the second sub-portion surface 18I would need to extend further away from the fastener head 18B and consequently form a smaller angle $\gamma_3$ (FIG. 5B) with the fastener axis $A_F$ than the embodiment shown.

The fastener body second recess 18F can comprise a second recess first abutment surface 18J extending inwardly from the fastener peripheral surface 18D, and a second recess second abutment surface 18K extending from the second recess first abutment surface 18J to the fastener peripheral surface 18D. The second recess first abutment surface 18J can be flat. The second recess second abutment surface 18K can be flat. The second recess first and second abutment surfaces 18J, 18K can form an external right-angle with each other. The second recess second abutment surface 18K can be further than the second recess first abutment surface 18J from the fastener head 18B.

The fastener head 18B can be elongated. In the plan view of the fastener top surface 18M at a clamped position, shown in FIG. 4A, the fastener head 18B has an oblong shape and is elongated in a direction along the holding plane $P_H$. The fastener head 18B extends further than the fastener neck 18C in a direction along the holding plane $P_H$, and is thereby configured to simultaneously clamp the cutting insert 14 at the first and second clamping lips 32C1, 32C2 of the insert aperture 32 which are spaced apart along the holding plane ($P_H$).

The biasing screw 20 comprises a screw threaded body portion 20A, a screw actuator portion 20B and a screw tool receiving recess 20C formed at a distal end of the biasing screw 20 from the screw actuator portion 20B thereof.

The threaded body portion 20A can be formed with an external threading configured for engaging complementary internal threading of the screw bore 28.

The screw actuator portion 20B can have a tapered shape configured for engaging the fastener body first recess 18E for causing the fastener head 18B to move towards the insert pocket 24.

The biasing arrangement 22 is disposed in the biasing bore 30 and comprises a biasing member 22A and a biasing spring 22B configured to continuously urge the biasing member 22A in the holding forward direction against the fastener body 18. As a result the biasing member and fastener can be configured to contact each other in all assembled positions (i.e. in the unclamped and clamped positions and any intermediary position therebetween).

More specifically, the biasing member 22A can have a cylindrical shape. The biasing member 22A can comprise a forward facing biasing member first surface 22C, located at a biasing member first end 22D thereof which opposes a biasing member second end 22E, configured to engage the biasing spring 22B. The biasing member first surface 22C can be configured to engage the second recess first abutment surface 18J of the fastener 18, to urge the fastener head 18B in a direction away from the insert pocket 24. The biasing member 22A can further comprise a side facing biasing member second surface 22F extending transversely to the biasing member first surface 22C and configured to engage the second recess second abutment surface 18K and prevent ejection of the fastener from the insert pocket 24. More specifically the biasing member second surface 22F can extend at a right-angle to the biasing member first surface 22C.

The second recess first abutment surface 18J and the biasing member first surface 22C can both be flat and parallel to each other, for preventing rotational motion of the fastener 18 when engaging to the biasing member 22A.

In operation, the clamping mechanism can be in an unclamped state as shown in FIG. 5A. The biasing spring 22B urges the biasing member first surface 22C against the second recess first abutment surface 18J causing the fastener 18 to move along the fastener axis $A_F$ in the holding upward and forward directions $D_{HU}$, $D_{HF}$ until the second recess second abutment surface 18K impacts the biasing member second surface 22F which arrests movement of the fastener 18 and prevents ejection thereof from the tool body holding portion 12C. Continuous engagement of the flat second recess first abutment surface 18J and the biasing member first surface 22C prevents rotational motion of the fastener 18 in all positions.

The cutting insert 14 can then be seated on the insert pocket 24 through insertion of the fastener head 18B through the insert aperture 32 thereof. More precisely the cutting insert 14 only contacts the insert pocket 24 at the insert pocket first support area 24A and the insert pocket second support area 24B thereof. Even more precisely, the insert pocket first support area 24A is only contacted at the two abutment points 24A4, 24A5 and the holding interlocking first portion 24C1.

A tool (not shown) is inserted into the screw tool receiving recess 20C and rotated, causing rotation of the biasing screw 20 and consequently movement along the holding longitudinal axis $A_{HL}$ in the holding backward direction $D_{HR}$. The biasing screw 20 initially contacts the perpendicular surface of the first recess first sub-portion 18G and subsequently moves the fastener 18 via the second sub-portion surface 18I thereof.

Movement of the fastener 18 is halted when the fastener head 18B clamps both the first and second clamping lip 32C1, 32C2. While it is feasible to design a fastener head and/or cutting insert to achieve clamping via engagement of a fastener with a single clamping lip it is believed that simultaneously clamping two clamping lips, and in particular two opposing clamping lips, can provide a possible advantage of stability against wobbling of a cutting insert.

To achieve this, the fastener head 18B can comprise a fastener first round end 18L extending from the fastener neck 18C in a direction transverse to the fastener axis $A_F$ and to a flat fastener top surface 18M, and a fastener second end 18N extending in a direction transverse to the fastener axis $A_F$ from the fastener neck 18C and away from the fastener first round end 18L. The fastener second end 18N can comprise fastener second end first and second surfaces 18O, 18P which intersect to form a sharp corner and respectively extend from the fastener top surface 18M and fastener neck 18C.

In particular, the fastener first round end 18L can be configured to engage the first clamping lip 32C1, and the fastener second end first surface 18O can be configured to engage the second clamping lip 32C2. The fastener second end second surface 18P can be flat to facilitate removal or mounting of a clamping insert relative to the fastener 18.

Figure 4A:
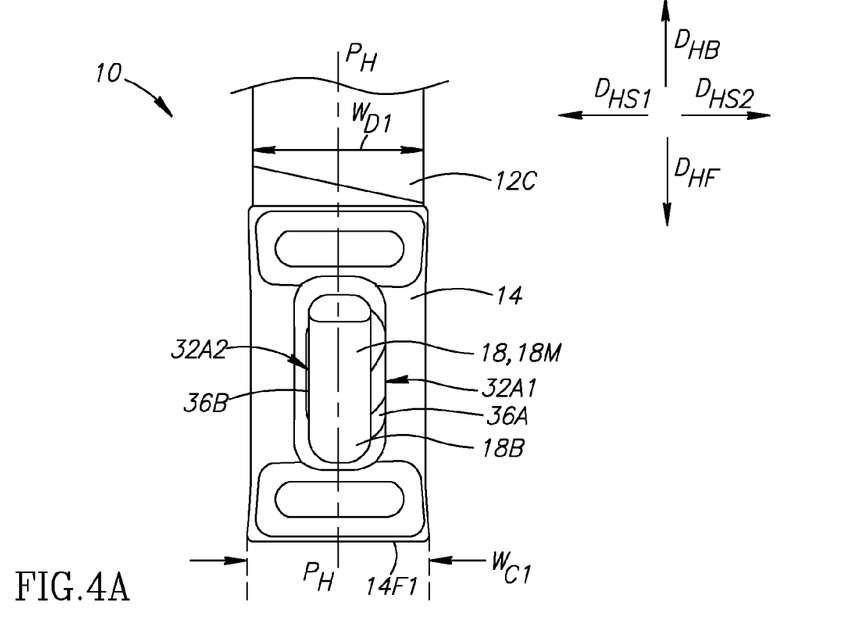
FIG. 4A is a plan view of a tool body holding portion and clamping mechanism of the cutting tool assembly in FIG. 1.
Figure 4B:
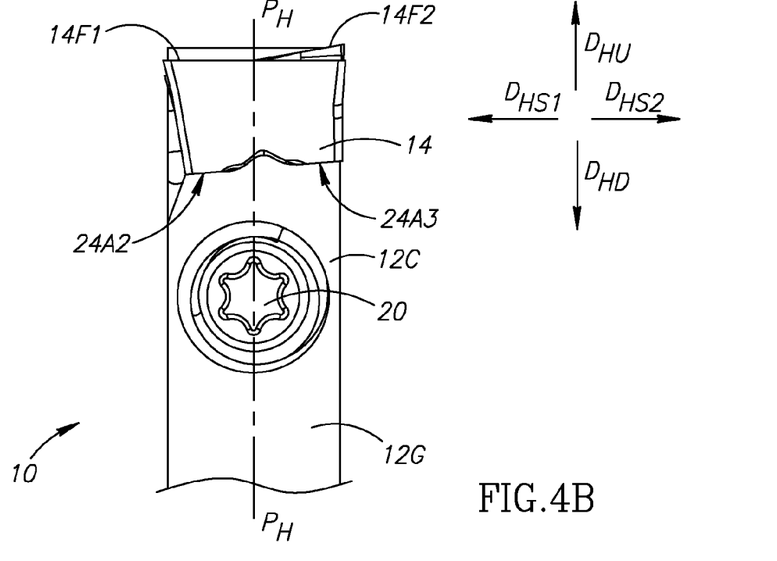
FIG. 4B is a front view of the tool body holding portion and clamping mechanism in FIG. 4A.

It is further noticed in FIG. 4A that the fastener head 18B is spaced apart from the aperture first and second side surfaces 32A1, 32A2 via gaps 36A, 36B. It will be understood that only the insert interlocking arrangement 34 and holding interlocking arrangement 24C restrain movement of the cutting insert 14 in the holding sideward first and second directions $D_{HS1}$, $D_{HS2}$. Accordingly, further possible advantage of such construction, is that since all clamping features are located within external boundaries of the cutting insert 14, allowing it to have a greater dimension than the cutting tool holding portion 12C which holds it, such cutting tool assembly 10 can be configured to provide a cutting depth which is longer than the length of the cutting insert 14, or at least the portion thereof comprising the cutting edge.

To elaborate, as seen best in FIG. 4A the insert first cutting edge 14F1 extends in a direction perpendicular to the holding plane ($P_H$) and the width $W_{C1}$ of such extension is greater than the width $W_{P1}$ of the tool body holding portion 12C, the widths $W_{C1}$ and $W_{P1}$ being taken in directions parallel to one another. Accordingly, the cutting insert 14 and the cutting tool assembly 10 in general are configured for achieving a relatively narrow cut of a workpiece. The depth of such cut is not limited (in the holding forward direction $D_{HF}$) is therefore not limited by the cutting insert 14 or the tool body holding portion 12C. Such advantages are also attainable due to the longitudinal orientation of the cutting tool body 12 and the clamping mechanism 16 (e.g. the alignment of the fastener 18, biasing screw 20 and biasing arrangement 22 all being along the holding plane $P_H$).

Removal of the cutting insert 14 can be carried out by rotating the biasing screw 20 in an opposite direction. Notably the biasing spring 22B is configured to quickly urge the fastener 18 into the position shown in FIG. 5A, while the biasing member 22A prevents undesired ejection thereof from the tool body holding portion 12C.

Further possible advantages of this construction can include:
  unimpeded chip flow above the cutting insert due, inter alia, to
    the fastener 18 and the tool body holding portion 12C not extending above the cutting insert 14, and/or
    each clamping lip 32C1, 32C2 being spaced apart from the insert top surface 14A to facilitate the fastener head 18B to descend into the insert aperture 32
  sturdy clamping, as the use of rigid-elements (biasing screw 20 and fastener 18) can have a longer life-span than clamping with an elastic element (such as a jaw-like construction); and
  relatively narrower cuts can be achieved due to
    slanting of at least one cutting edge;
    the cutting edge or edges are the widest portions of the cutting insert;
  each clamping lip 32C1, 32C2 being spaced apart from the insert bottom surface 14B which can allow unimpeded insertion of a fastener head 18B through the insert aperture 32, than would be in a case where the clamping lip is flush with the insert bottom surface 14B; and
  the clamping mechanism 16 not comprising parts which may become fully detached when an insert is indexed or replaced (notably the biasing screw 20 is not configured for removal when replacing a cutting insert, but rather only intended for a small number of rotations (e.g. one or two), and such construction can ease replacement of a cutting insert as extremely small screws can be difficult to rotate consecutively several times and are prone to being dropped and/or lost after removal from a cutting tool body).

It is understood that in view of all of the possible advantages mentioned above of the clamping mechanism 16 and/or the biasing arrangement 22, that they could also possibly be advantageous when used with cutting tool assemblies and/or cutting inserts which are not configured for providing narrow/deep cuts (such as the cutting tool assembly 10 and cutting insert 14 described).

While the subject matter of the present application has been described with reference to one or more specific embodiments, the description is intended to be illustrative as a whole and is not to be construed as limiting the subject matter of the present application to the embodiments shown.

What is claimed is:

1. A cutting insert (14) having an insert longitudinal axis ($A_{IL}$) and comprising
opposing insert top and bottom surfaces (14A, 14B),
opposing insert first and second end surfaces (14C1, 14C2) extending transverse to the insert longitudinal axis ($A_{IL}$), each end surface connected to the insert top and bottom surfaces (14A, 14B),
opposing insert first and second side surfaces (14D1, 14D2) extending along the insert longitudinal axis ($A_{IL}$), each side surface connected to the insert top and bottom surfaces (14A, 14B) and to the insert first and second end surfaces (14C1, 14C2),
an insert first intersection (14G1) defined at an intersection of the insert top surface (14A), the insert first end surface (14C1) and the insert first side surface (14D1),
an insert second intersection (14H1) defined at an intersection of the insert top surface (14A), the insert first end surface (14C1) and the insert second side surface (14D2),
a cutting edge (14F1) extending from the insert first intersection (14G1) to the insert second intersection (14H1), and
an insert aperture (32) opening out to the insert top and bottom surfaces (14A, 14B);
the insert aperture (32) comprising
opposing aperture first and second side surfaces (32A1, 32A2) extending along the insert longitudinal axis ($A_{IL}$), and
opposing aperture first and second end surfaces (32B1, 32B2) extending transverse to the insert longitudinal axis ($A_{IL}$), and each being connected to the aperture first and second side surfaces (32A1, 32A2);
wherein, in a plan view of the insert top surface (14A), the cutting insert (14) and the insert aperture (32) both have oblong shapes which are elongated along the insert longitudinal axis ($A_{IL}$); and
wherein at least one of the aperture first and second end surfaces (32B1, 32B2) is formed with a clamping lip (32C1, 32C2).

2. The cutting insert (14) according to claim 1, wherein each of the aperture first and second side surfaces (32A1, 32A2) is devoid of a clamping lip.

3. The cutting insert (14) according to claim 1, wherein both of the aperture first and second end surfaces (32B1, 32B2) are formed with a clamping lip (32C1, 32C2).

4. The cutting insert (14) according to claim 1, wherein each said clamping lip (32C1, 32C2) comprises a projecting portion (32E1, 32E2) which projects furthest into the insert aperture (32) at a location between, and spaced apart from, the insert top and bottom surfaces (14A, 14B).

5. The cutting insert (14) according to claim 1, wherein:
an insert third intersection (14I1) is defined at an intersection of the insert bottom surface (14B), the insert first end surface (14C1) and the insert first side surface (14D1);
an insert fourth intersection (14J1) is defined at an intersection of the insert bottom surface (14B), the insert first end surface (14C1) and the insert second side surface (14D1); and
the insert first intersection (14G1) is closer to the insert third intersection (14I1) than the insert second intersection (14H1) is to the insert fourth intersection (14J1).

6. The cutting insert (14) according to claim 1, wherein the insert bottom surface (14B) is formed with an insert interlocking arrangement (34) for preventing lateral movement of the cutting insert (14) in a direction transverse to the insert longitudinal axis ($A_{IL}$).

7. The cutting insert (14) according to claim 6, wherein the interlocking arrangement (34) comprises a groove formed in the insert bottom surface (14B) and extending in a direction along the insert longitudinal axis ($A_{IL}$), the groove being formed with a groove major recess (34A) and a groove clearance recess (34B1, 34B2) on each side thereof, each groove clearance recess (34B1, 34B2) extending between the groove major recess (34A) and the insert bottom surface (14B).

8. The cutting insert (14) according to claim 1, wherein, in a plan view of the insert top surface (14A), no part of the cutting insert (14) projects further than said cutting edge (14F1) in a direction transverse to the insert longitudinal axis ($A_{IL}$).

9. The cutting insert (14) according to claim 1, further comprising an insert wall (14P1) defined between the insert top and bottom surfaces (14A, 14B), the aperture first side surface (32A1) and the insert first side surface (14D1);
the insert wall (14P1) comprising an insert first wall portion (14Q1) and an insert second wall portion (14Q2) located between the insert first wall portion (14Q1) and the insert first end surface (14C1);
the insert first and second wall portions (14Q1, 14Q2) having respective insert first and second wall portion widths ($M_{I3}$, $M_{I4}$);
the insert first and second wall portion widths ($M_{I3}$, $M_{I4}$) each being measured from the aperture first side surface (32A1) to the insert first side surface (14D1) in a direction perpendicular to the insert longitudinal axis ($A_{IL}$); and
the insert first wall portion width ($M_{I3}$) has a greater magnitude than the insert second wall portion width ($M_{I4}$).

10. The cutting insert (14) according to claim 1, further comprising insert first and second walls (14P1, 14P2), the insert first wall (14P1) being defined between the insert top and bottom surfaces (14A, 14B), the aperture first side surface (32A1) and the insert first side surface (14D1), the insert second wall (14P2) being defined between the insert top and bottom surfaces (14A, 14B), the aperture second side surface (32A2) and the insert second side surface (14D2);
each of the insert first and second walls (14P1, 14P2) having an insert minimum wall width ($M_{I5}$, $M_{I6}$) measured in a direction perpendicular to the insert longitudinal axis ($A_{IL}$);
wherein the insert minimum wall width ($M_{I5}$, $M_{I6}$), has a magnitude of greater than or equal to 0.7 mm.

11. The cutting insert (14) according to claim 1, wherein an insert maximum width ($M_{I7}$), measured from the insert first side surface (14D1) to the insert second side surface (14D2) in a direction perpendicular to the insert longitudinal axis ($A_{IL}$), has a magnitude of less than 5 mm.

12. The cutting insert (14) according to claim 1, wherein said oblong shapes are both rectangles, or the insert aperture (32) is an oval and the cutting insert (14) is a rectangle.

13. The cutting insert (14) according to claim 1, further having 180 degrees rotational symmetry about an insert aperture axis ($A_{IA}$) which extends in a direction perpendicular to the insert longitudinal axis ($A_{IL}$) and through a center ($C_{IA}$) of the insert aperture (32).

14. A cutting tool body (12) comprising
a tool body inner portion (12A) and a tool body holding portion (12C) extending therefrom;
the tool body holding portion (12C) having an imaginary holding plane ($P_H$) and comprising
opposing holding bottom and top ends (12D, 12E), parallel opposing holding first and second side surfaces (12F1, 12F2), each being connected to the holding bottom and top ends (12D, 12E) and each being located on a different side of the imaginary holding plane ($P_H$) and being parallel thereto, and a holding front end (12G) located on an opposing side of the tool body holding portion (12C) from the tool body inner portion (12A) and being connected to the holding bottom and top ends (12D, 12E) and to the holding first and second side surfaces (12F1, 12F2);

the holding top end (12E) comprising an insert pocket (24) defined only by an insert pocket first support area (24A) oriented transverse relative to the holding plane ($P_H$) and connected to the holding first and second side surfaces (12F1, 12F2) and the holding front end (12G), and an insert pocket second support area (24B) spaced apart from the holding front end (12G) and oriented transverse relative to both the insert pocket first support area (24A) and the holding plane ($P_H$);

the tool body holding portion (12C) further comprising a fastener bore (26) opening out to the insert pocket first support area (24A), and a screw bore (28) intersecting the fastener bore (26);

wherein the holding top end (12E) comprises a holding interlocking arrangement (24C) at the insert pocket first support area (24A) which extends in a direction along the holding plane ($P_H$) and which is configured for preventing lateral movement of a cutting insert (14) mounted thereon in a direction transverse to the holding plane ($P_H$).

15. The cutting tool body (12) according to claim 14, wherein the holding interlocking arrangement (24C) further comprises holding interlocking arrangement first and second portions (24C1, 24C2) disposed on different sides of the fastener bore (26), the holding interlocking arrangement first portion (24C1) having a holding interlocking arrangement first portion maximum width dimension ($W_{f1}$) which is greater in magnitude than a holding interlocking arrangement second portion maximum width dimension ($W_{f2}$), both of which being measurable along a holding width axis ($A_{HW}$) perpendicular to the holding plane ($P_H$).

16. The cutting tool body (12) according to claim 14, wherein insert pocket first support area (24A) is slanted with respect to the holding plane ($P_H$).

17. The cutting tool body (12) according to claim 16, wherein the insert pocket first support area (24A) comprises a longitudinally extending support area first slanted portion (24A1) which is connected to and forms an obtuse seating surface first internal angle ($\alpha_1$) with the holding first side surface (12F1), and extends to a support area second slanted portion (24A2) and forms an obtuse seating surface second internal angle ($\alpha_2$) with the support area first slanted portion (24A1).

18. The cutting tool body (12) according to claim 14, wherein the holding interlocking arrangement (24C) is in the form of a ridge.

19. The cutting tool body (12) according to claim 14, wherein the tool body holding portion (12C) further comprises a biasing bore (30) intersecting the fastener bore (26).

20. The cutting tool body (12) according to claim 19, wherein the biasing bore (30) and the screw bore (28) are coaxial.

21. A cutting tool assembly (10) comprising, in combination, the cutting insert (14) according to claim 1, and the cutting tool body (12) according to claim 19, further comprising a fastener (18), a biasing screw (20) and a biasing arrangement (22);

the fastener (18) comprising a fastener body (18A) receivable into the fastener bore (26) and being formed with fastener body first and second recesses (18E, 18F), and a fastener head (18B) configured for securing the cutting insert (14) to the insert pocket (24);

the fastener body second recess (18F) comprising a second recess first abutment surface (18J) extending inwardly from a fastener peripheral surface (18D) of the fastener body (18A), and a second recess second abutment surface (18K) extending from the second recess first abutment surface (18J) to the fastener peripheral surface (18D);

the second recess second abutment surface (18K) being further than the second recess first abutment surface (18J) from the fastener bore (26);

the biasing screw (20) comprising a threaded body portion (20A), and an actuator head (20B) engageable with the fastener body first recess (18E) for causing the fastener head (18B) to move towards the insert pocket (24);

the biasing arrangement (22) being receivable into the biasing bore (30) and comprising a biasing member (22A) and a biasing spring (22B) configured to urge the biasing member (22A) against the fastener body (18A);

the biasing member (22A) comprising a biasing member first surface (22C) configured to engage the second recess first abutment surface (18J) to urge the fastener head (18B) in a direction away from the insert pocket (24), and a biasing member second surface (22F) extending transversely to the biasing member first surface (22C) and configured to engage the second recess second abutment surface (18K) to prevent ejection of the fastener (18) from the insert pocket (24).

22. The cutting tool assembly (10) according to claim 21, wherein, in a plan view of the fastener top surface (18M) at a clamped position of the cutting tool assembly (10), the fastener head (18B) is elongated in a direction along the holding plane ($P_H$).

23. The cutting tool assembly (10) according to claim 21, wherein the fastener head (18) is configured to simultaneously clamp the cutting insert's first and second clamping lips (32C1, 32C2) which are spaced apart along the holding plane ($P_H$).

24. The cutting tool assembly (10) according to claim 21, wherein the fastener head (18B), at a clamped position of the cutting tool assembly (10), is spaced apart from both the aperture first and second side surfaces (32A1, 32A2).

25. The cutting tool assembly (10) according to claim 21, wherein, in a plan view of the cutting insert (14) at a clamped position of the cutting tool assembly, each said cutting edge (14F1, 14F2) of the cutting insert (14) extends in a direction perpendicular to the holding plane ($P_H$).

* * * * *